US 11,311,974 B2

(12) United States Patent
Chu (10) Patent No.: US 11,311,974 B2
(45) Date of Patent: Apr. 26, 2022

(54) METHOD OF TORQUE CONTROL AND APPARATUS THEREOF

(71) Applicant: China Pneumatic Corporation, Taoyuan (TW)

(72) Inventor: Hsiu-Feng Chu, Taoyuan (TW)

(73) Assignee: China Pneumatic Corporation, Taoyuan (TW)

( * ) Notice: Subject to any disclaimer, the term of this patent is extended or adjusted under 35 U.S.C. 154(b) by 234 days.

(21) Appl. No.: 16/742,700

(22) Filed: Jan. 14, 2020

(65) Prior Publication Data

US 2020/0156194 A1 May 21, 2020

Related U.S. Application Data

(63) Continuation of application No. 15/329,839, filed as application No. PCT/CN2014/000760 on Aug. 12, 2014, now Pat. No. 10,564,657.

(30) Foreign Application Priority Data

Jul. 31, 2014 (CN) .......................... 201410371437.6

(51) Int. Cl.
*B23P 19/06* (2006.01)
*G05D 17/02* (2006.01)
*B25B 23/145* (2006.01)

(52) U.S. Cl.
CPC ........ *B23P 19/066* (2013.01); *B25B 23/1456* (2013.01); *G05D 17/02* (2013.01); *B25B 23/1453* (2013.01)

(58) Field of Classification Search
CPC .................. B23P 19/065; B23P 19/066; B25B 23/145–1456; G05D 17/02; G01L 25/003
See application file for complete search history.

(56) References Cited

U.S. PATENT DOCUMENTS 4,322,965 A * 4/1982 Bickford ............... G01L 25/003
73/1.12
4,887,499 A * 12/1989 Kipfelsberger ..... B25B 23/0078
81/470

(Continued)

FOREIGN PATENT DOCUMENTS

| CN | 102607758 A | 7/2012 |
| TW | I396609 B1 | 5/2013 |
| TW | I432293 B | 4/2014 |

*Primary Examiner* — Joshua G Kotis
(74) *Attorney, Agent, or Firm* — Wang Law Firm, Inc.

(57) ABSTRACT

A method of torque control and a torque control apparatus for a pneumatic torque tool are provided. The method includes: connecting a torque control apparatus between an air supply system and a pneumatic torque tool; under predetermined working and control conditions, driving the pneumatic torque tool at the first and second working air pressures to calibrate output torque, and to obtain maximum and minimum torque values; constructing correspondence relationship between air pressure and torque value based on the first and second working air pressures and the maximum and minimum torque values obtained; entering any target torque value ranging from minimum torque value to maximum torque value of the correspondence relationship to obtain a corresponding working air pressure value and drive the pneumatic torque tool; and verifying whether all working and control conditions are controlled within a predetermined range of variation to control the output torque.

10 Claims, 7 Drawing Sheets

(56) References Cited

U.S. PATENT DOCUMENTS

| | | | | |
|---|---|---|---|---|
| 5,668,328 | A | * | 9/1997 | Steber .................. B25B 21/005 73/862.23 |
| 6,567,754 | B1 | * | 5/2003 | Lysaght ................ B23P 19/066 702/41 |
| 6,668,212 | B2 | * | 12/2003 | Colangelo, III ...... B25B 23/145 173/5 |
| 7,647,808 | B2 | * | 1/2010 | Junkers ................ G01L 25/003 73/1.12 |
| 7,779,704 | B1 | | 8/2010 | Chu |
| 2004/0045729 | A1 | * | 3/2004 | Lehnert ................ B25B 23/145 173/1 |
| 2007/0214921 | A1 | * | 9/2007 | Fechter ................ B25B 23/145 81/467 |
| 2008/0283262 | A1 | * | 11/2008 | Kim ........................ B25B 21/00 173/178 |
| 2019/0022836 | A1 | * | 1/2019 | Chu ........................ B25B 21/02 |
| 2020/0238486 | A1 | * | 7/2020 | Huang ................ B25B 23/1453 |

* cited by examiner

```
┌─────────────────────────────────────────────────┐
│   Connecting an air pressure system to a torque control   │
│ apparatus with an air hose, so as to supply a stable working │
│   air pressure to the pneumatic torque tool according to the   │──S11
│    characteristics of the tool and a fastener to be fastened as    │
│        well as the predetermined operating conditions        │
└─────────────────────────────────────────────────┘
                          ↓
┌─────────────────────────────────────────────────┐
│      Performing calibration of output torque before the      │
│      fastening operation, by separately driving the pneumatic      │
│    torque tool with the highest working air pressure and the    │──S12
│     lowest working air pressure, which allow the pneumatic     │
│      torque tool to operate properly under the condition of      │
│           steady air supply during fastening process           │
└─────────────────────────────────────────────────┘
                          ↓
┌─────────────────────────────────────────────────┐
│   Constructing a correspondence curve between air pressure   │
│      values and torque values, based on the maximum torque      │
│   value and the minimum torque value individually obtained   │──S13
│      from the calibration, as well as the corresponding highest      │
│                and lowest working air pressures                │
└─────────────────────────────────────────────────┘
                          ↓
┌─────────────────────────────────────────────────┐
│        Entering a target torque value ranging between the        │
│     maximum torque value and the minimum torque value, in     │
│   order to obtain a corresponding working air pressure value   │
│   from the correspondence curve between air pressure values   │──S14
│    and torque values, wherein the corresponding working air    │
│       pressure is applied to drive the pneumatic torque tool to       │
│                  perform the fastening operation                  │
└─────────────────────────────────────────────────┘
```

METHOD OF TORQUE CONTROL AND APPARATUS THEREOF

CROSS-REFERENCE TO RELATED APPLICATION

This application is a continuation-in-part of U.S. patent application Ser. No. 15/329,839, filed on Jan. 27, 2017, which is a National Stage Application of PCT International Patent Application No. PCT/CN2014/000760 filed on Aug. 12, 2014, which claims priority to Chinese Patent Application No. 201410371437.6, filed on Jul. 31, 2014, and the disclosure of each of which is incorporated by reference herein in its entirety by reference.

BACKGROUND OF THE INVENTION

1. Field of the Invention

The present invention relates to a method of controlling torque and an apparatus using the same, and more particularly, a method of controlling torque and an apparatus using the same, which control the output torque under the predetermined working and control conditions, according to a correspondence between the air pressure and the torque constructed in advance.

2. Description of the Related Art

For all the torque tools driven by compressed air, such as pneumatic impact wrenches, pneumatic oil pulse wrenches, pneumatic torque multipliers, pneumatic screwdrivers with clutch, and so on, their test results or operating performance tend to be affected by an unstable working air pressure during the process of testing or operating them. Conventional pneumatic torque tools usually have their torque controlled by the pressure or airflow of the compressed air driving those tools. Since the compressed air driving the pneumatic torque tools is affected by the factors such as the capability of the on-site compressed air system to supply gas, the torque driving structure of the tools, and the air consumptions of the tools, it is hard to control the magnitudes of their output torques.

The output torque of the conventional impact torque tool is usually controlled by adjusting the air supply pressure and the airflow thereof, or by adjusting the pressure, the airflow and the duration of fastening operation. However, since the working air pressure during the fastening operation is not stable, the airflow to the tool is directly affected, which in turn causes the deviation of the output torque to be extremely large. Even if the tool is disposed with a torque measuring device, the frequency and amplitude of the vibration that arises from the impact will pose difficulty for the analysis of signals, and hence it will be difficult to control the torque output effectively.

The output torque of conventional oil pulse torque tools is normally controlled by adjusting their working air pressure and the oil pressure in the hydraulic cylinder. Despite having a better torque control precision compared to the former, numerous factors, such as the unstable air pressure during the fastening process directly affecting the airflow to the tool, or the structural feature of the hydraulic cylinder and the rising temperature of the hydraulic fluid inside the cylinder during continuous operation, tend to limit the range of adjustment and the control precision of the torque.

The static torque tool achieves torque amplification through the pneumatic motor coupled with structures such as the planetary gearing and reaction arm. The precision thereof is higher albeit the time it takes to fasten is longer, and the slow speed results in low efficiency, not to mention the tool is heavier, which tends to cause fatigue in the operator.

A torque tool with clutch is a tool that achieves torque control via a pneumatic motor working in conjunction with the planetary reduction gearing, in addition to the tension of a spring pushing against the clutch; while it has an acceptable control precision, nevertheless, when the operation of the tool is halted, the reaction force generated increases as the torque output of the tool increases, thereby making it difficult to handle the tool for a prolonged period of time, or even causing issues such as fatigue or occupational injury such as elbow arthritis to the operation personnel. As a consequence, the industry has been working on combining the advantages of those tools mentioned above with various torque measuring and control devices to improve the precision of output torque control.

There are numerous means and methods to control the torque of a torque tool, usually their torque is controlled through the use of torque measuring device utilizing pressure (air pressure or oil pressure), flow rate (air consumption of the tool), the deformation and angle of the torque output shaft, or the electromagnetic induction coil, or through the use of torque control device incorporating the spring tension and clutch, or even the duration of fastening. Their results, however, are quite limited.

In conclusion, the majority of torque tools control the torque by means of deformation signals detected by the deformation sensor (e.g. strain gauge or solenoid electromagnetic induction coil), which is installed at suitable positions such as the output shaft of those tools, or by calculating the angular displacement (e.g. using a gyroscope) after the surfaces of the bolt and the fastened object come into contact, in conjunction with the calculation of the fastening duration, or the flow rate or the pressure of air entering the driving motor of the tools. However, since the pulse signals generated by the impacts of the impact or oil pulse torque tools are erratic and the fastening duration thereof is too short, it is hard to control the torque of such tools. In addition, when the detected signals, which are generated by those electronic detection apparatus installed in the tools, is to be transmitted to the built-in or external control apparatus of the tool, so as to shut off the air supply in real-time, the accuracy of the torque control is bound to be affected because of the hysteresis of the signal transmission when the signals are being relayed between electronic and the mechanical components, such as between the microprocessor and the solenoid valve; moreover, the conditions of the fastener and the object to be fastened, e.g. the material, surface smoothness, hardness or surface lubrication, or even the way the operator holding the tool while fastening, will directly or indirectly affect the accuracy of the torque control.

To this end, the inventor of the present invention has spent countless years researching in torque control products, and has managed to obtain the patents as follows: "Anti-vibration torque sensing and control device for tools" (US Publication No. US7779704), "Apparatus capable of controlling, tracking and measuring tightening torque and locking force, and method for controlling, tracking, measuring and calibrating thereof" (China Publication No. ZL 201210011877.1), "Torque control apparatus of dynamic locking tool and its control procedure" (Taiwan Publication No. I396609), and "Torque control device for an impact type pneumatic torsion spanner" (Taiwan Publication No.

1432293); the inventor subsequently delves further into the operating characteristics of the impact or oil pulse torque tool, and with the confirmation from various empirical data, the inventor develops a method of controlling torque and an apparatus using the same, in order to solve the most challenging problem, i.e. the control and measurement of the torque of pneumatic impact or pulse torque wrench, which has been troubling the industry for years, thereby remedying the shortcomings in the state of the art and promoting the practicality of the tool in the industry.

SUMMARY OF THE INVENTION

In accordance with the objective of the present invention, a method of controlling the torque output of the fluid powered torque tool is provided, which aims to solve the problem regarding the failure to control the output torque effectively, which occur in various fluid powered torque tools, especially fluid powered impact or pulse torque tools.

The torque control method for a fastening operation of a fluid powered torque tool includes the following steps: connecting a fluid pressure system to a torque control apparatus with a fluid hose; determining a range of operable fluid pressure of the fluid powered torque tool according to characteristics of the tool, a fastener to be fastened or loosened and predetermined operating conditions, and supplying fluid within the range of operable fluid pressure to the fluid powered torque tool accordingly; performing calibration of output torque of the fluid powered torque tool by separately driving the fluid powered torque tool with a first working fluid pressure and a second working fluid pressure different from the first working fluid pressure, and obtaining a first torque value and a second torque value respectively corresponding to the first working fluid pressure and the second working fluid pressure, with the first working fluid pressure and the second working fluid pressure being within the range of operable fluid pressure; constructing a correspondence relationship of pressure and torque according to the first working fluid pressure and the second working fluid pressure, and the first torque value and the second torque value; and setting a target torque value that is between the first torque value and the second torque value, and obtaining a corresponding working fluid pressure of the target torque value according to the correspondence relationship of pressure and torque, such that the corresponding working fluid pressure is applied to the fluid powered torque tool to perform the fastening operation.

Optionally, the calibration of output torque comprises the step of: driving a torque measuring device with the fluid powered torque tool, wherein the torque control apparatus simultaneously collects a pressure signal measured by a fluid pressure sensor and a torque signal measured by the torque measuring device during calibration, and the pressure signal and the torque signal are stored in a memory device of the torque control apparatus.

Optionally, the method further comprises the following steps: during the fastening operation in which the fastener is fastened by the fluid powered torque tool, measuring a third torque value at which the fastener is fastened using a torque calibration tool corresponding to a third working fluid pressure measured by a fluid pressure sensor of the torque control apparatus; and storing the third torque value and the third working fluid pressure in a memory device of the torque control apparatus to update the correspondence relationship of pressure and torque.

Optionally, the method further comprises the following steps: repeating the calibration of output torque for a plurality of times to obtain a plurality sets of the first torque values and the second torque values corresponding to a plurality sets of the first working fluid pressures and the second working fluid pressures; calculating average values of the first torque values, the second torque values, the first working fluid pressures and the second working fluid pressures; and constructing the correspondence relationship of pressure and torque based on the average values of the first torque values, the second torque values, the first working fluid pressures, and the second working fluid pressures.

Optionally, the method further comprises the following steps: entering a corrected torque value for the target torque value; adjusting the correspondence relationship of pressure and torque according to a difference between the target torque value and the corrected torque value, and generating an adjusted correspondence relationship of pressure and torque with a corrected first torque value and a corrected second torque value; and when a new target torque value is entered, obtaining the working fluid pressure corresponding to the new target torque value based on the adjusted correspondence relationship of pressure and torque, and driving the fluid powered torque tool with the working fluid pressure to perform the fastening operation.

Optionally, the method further comprises the following steps: monitoring a fluid pressure throughout the fastening operation or the calibration of output torque; and when the fluid pressure falls beyond the range of operable fluid pressure, signaling a warning through a warning device, or cutting the fluid supply to the fluid powered torque tool.

Optionally, the correspondence relationship is a linear relationship established according to the first working fluid pressure and the second working fluid pressure, and the first torque value and the second torque value.

Optionally, the predetermined operating conditions include a fluid flow rate and a fastening duration.

Optionally, the first working fluid pressure and the second working fluid pressure are respectively a lowest working fluid pressure and a highest working fluid pressure of the fluid powered torque tool.

Optionally, the fluid powered torque tool may be a pneumatic torque tool or a hydraulic torque tool.

Taking advantage of the characteristics of the torque tool, which is "under a predetermined operating conditions, e.g. same airflow rate and same fastening duration, and under a stable working air pressure that is to be monitored throughout the operation, the same tool will produce the same stable torque", the method of controlling torque and the torque control apparatus of the present invention perform calibration using torque measuring device before the fastening operation, and a "correspondence relationship between the air pressure and the torque values for the tool under known operating conditions that are predetermined" is constructed. Furthermore, after the fastening operation, verify again whether the tightening torque is within the predetermined range; the aforementioned torque correction may be performed whenever necessary, such that a fastening operation with a more accurate tightening torque may be achieved; therefore, the torque tool no longer require the precision of its torque control apparatus or various sensors to control its output torque; instead, with the method of controlling torque and the torque control apparatus of the present invention, the fastening operation of the impact or pulse torque wrench can be controlled in a more economic, reliable, and effective manner compared to any control technique known in the art.

DETAILED DESCRIPTION OF THE PREFERRED EMBODIMENTS

Various aspects such as the technical features, advantages or content of the present disclosure will be set forth in detail in the form of preferred embodiments hereinafter, and the description will be made along with reference to the attached drawings, which are solely illustrative and serve to provide better understanding of the present disclosure only, the scale and/or proportion of any portion of the drawing do not represent the actual configuration of the disclosure, hence the scale, proportion or shape in the drawings should not be misconstrued as limiting the scope of the disclosure.

Figure 1:
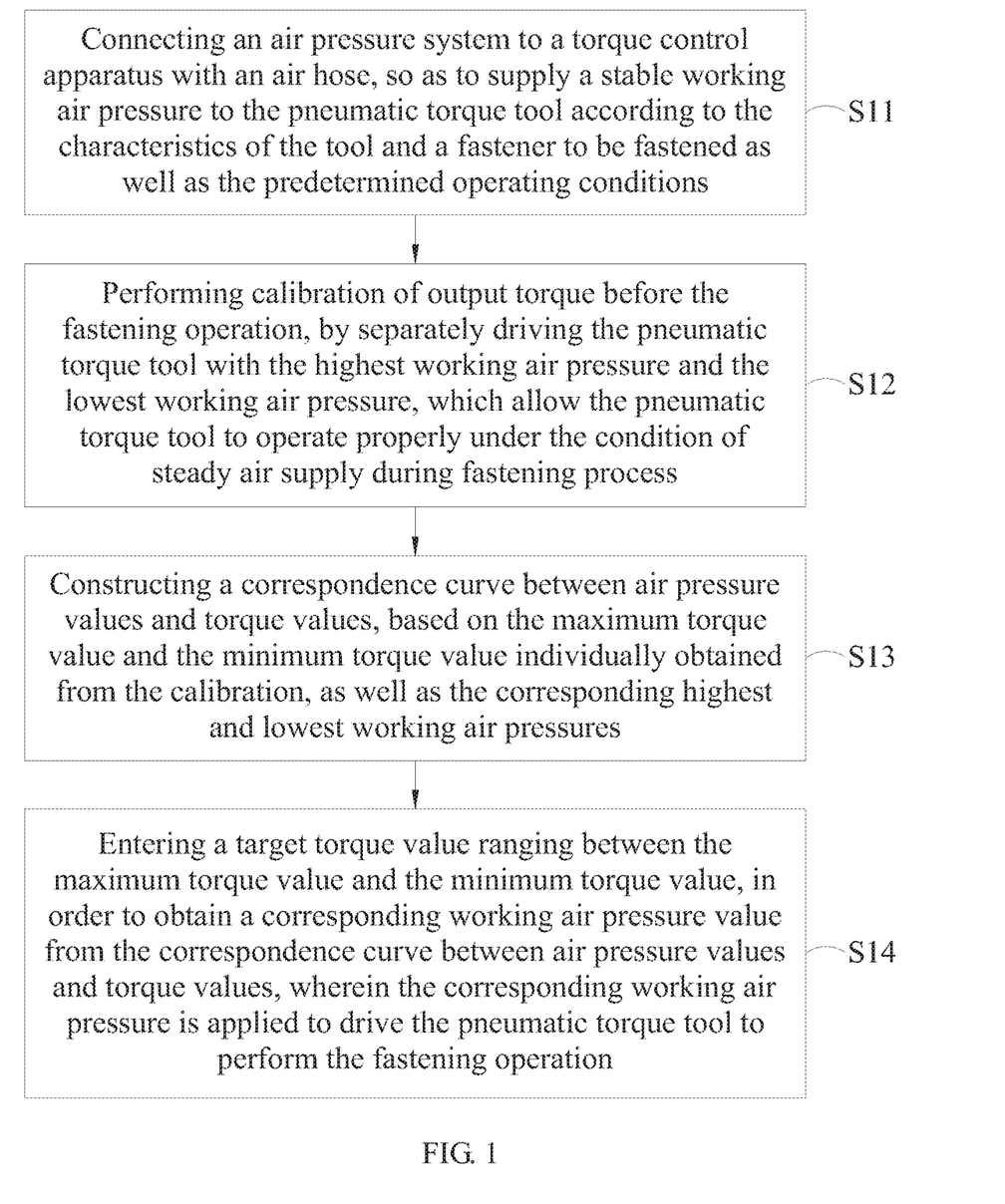
FIG. 1 is a flowchart illustrating the steps according to the method of controlling torque of the present invention.

Please refer to FIG. 1, which is a flowchart illustrating the steps according to the method of controlling torque of the present invention. As shown in the drawing, method of controlling torque of the present invention may include the following steps: (S11) connecting an air pressure system to a torque control apparatus with an air hose, so as to supply a stable working air pressure to the pneumatic torque tool according to the characteristics of the tool and a fastener to be fastened and according to predetermined operating conditions; (S12) performing calibration of output torque before the fastening operation, by separately driving the pneumatic torque tool with the highest working air pressure and the lowest working air pressure, which allow the pneumatic torque tool to operate properly under the condition of steady air supply during fastening process; (S13) constructing a correspondence relationship between air pressure and torque values, based on the maximum torque value and the minimum torque value individually obtained from the calibration, as well as the corresponding highest and lowest working air pressures; (S14) entering a target torque value ranging from the maximum torque value to the minimum torque value, in order to obtain a corresponding working air pressure value from the correspondence relationship between air pressure and torque values, wherein the corresponding working air pressure is applied to drive the pneumatic torque tool to perform the fastening operation.

Or alternately, the torque control method for a fastening operation of a fluid powered torque tool may include the following steps. A step of connecting a fluid pressure system to a torque control apparatus with a fluid hose may be provided, in which the fluid may be air or oil and the fluid pressure system may be an air pressure system or a hydraulic pressure system. A step of determining a range of operable fluid pressure of the fluid powered torque tool according to characteristics of the tool, a fastener to be fastened or loosened and predetermined operating conditions may be provided. The range of operable fluid pressure may be determined by trial or error, or determined by the experiment results in a laboratory. A step of supplying fluid within the range of operable fluid pressure to the fluid powered torque tool may be provided. Then, a step of performing calibration of output torque of the fluid powered torque tool by separately driving the fluid powered torque tool with a first working fluid pressure and a second working fluid pressure different from the first working fluid pressure may be carried out. A first torque value and a second torque value respectively corresponding to the first working fluid pressure and the second working fluid pressure may be obtained, in which the first working fluid pressure and the second working fluid pressure are within the range of operable fluid pressure. Subsequently, a correspondence relationship of pressure and torque according to the first working fluid pressure and the second working fluid pressure, and the first torque value and the second torque value may be constructed. Before the fastening operation, a target torque value that is between the first torque value and the second torque value may be set, and a corresponding working fluid pressure of the target torque value according to the correspondence relationship of pressure and torque may be obtained. Consequently, the corresponding working fluid pressure may be applied to the fluid powered torque tool to perform the fastening operation.

Figure 3:
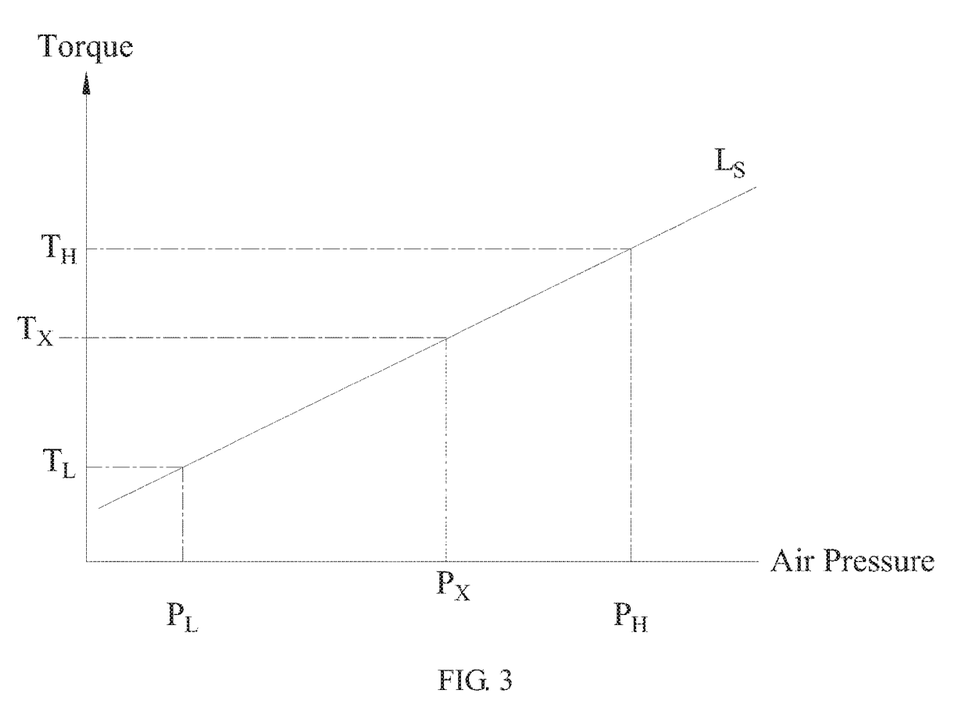
FIG. 3 is the diagram showing the correspondence relationship between the air pressure and the torque values according to the method of controlling torque of the present invention.

That is to say, at first, the airflow rate (for impact wrench) or the oil pressure of the hydraulic chamber (for oil pulse wrench) of the pneumatic torque tool may be preset according to the characteristics of the pneumatic torque tool and the fastener, and various working and control conditions, e.g. the permissible range of pressure drop for each pressure sensor, the permissible range of working air pressure variation throughout the fastening process, the tolerance of the torque to determine whether the target torque value is OK or not OK, the range of pressure variation to determine whether the tool is running with load or without load, and the time taken to complete the fastening operation, may be set in the torque control apparatus. Thereafter, the pneumatic torque tool may be driven separately with the highest working air pressures and the lowest working air pressures, which are within the range of pressure that allows the tool to operate properly, to fasten the fastener directly, and then the torque measuring device may be used to measure the corresponding torque value; in addition to that, the pressure variation throughout the fastening operation is simultaneously transmitted to the torque control apparatus and stored therein; alternatively, the pneumatic torque tool may be driven, and a torque meter may be used to perform the calibration of the torque output of the tool before the fastening operation, so as to obtain the corresponding maximum torque value and minimum torque value. After the fastening, the torque obtained from the verification using torque calibration tool, such as digital torque wrench, may be entered to the torque control apparatus, such that the original correspondence relationship between air pressure and torque value may be corrected, and the correction may stored. The microprocessor of the torque control apparatus may construct the correspondence relationship between the air pressure and the torque values, in accordance with the highest working air pressure and the lowest working air pressure, as well as the maximum torque value and the minimum torque value that correspond to the highest working air pressure and the lowest working air pressure, respectively. Subsequently, a target torque value, which ranges between the maximum torque value and the minimum torque value, may be entered via the torque control apparatus. The microprocessor may compute the working air pressure that correspond to the target torque value using the correspondence relationship between the air pressure and the torque values, and the working air pressure may be adjusted accordingly, by the means of automatic or manual pressure regulator, so as to drive the pneumatic torque tool to perform the actual fastening operation. Wherein, the correspondence relationship between the air pressure and the torque value is shown in FIG. 3, which may be approximated as a linear relationship.

Hereinafter, the principle of the present invention will be further illustrated.

The rotational inertia, otherwise known as moment of inertia, is the resistance of an object against angular acceleration. Comparing the linear motion to rotation $$F=m*a=m*dv/dt \quad \text{(Equation 1) (linear motion)}$$

$$T=I*\alpha=I*d\omega/dt \quad \text{(Equation 2) (rotation)}$$

where T: Torque (N*m), I: rotational inertia or moment of inertia (Kg*m$^2$)(rotating mechanism plus output shaft and the socket), V: velocity (m/s), $\alpha$: angular acceleration (rad/s$^2$), $\omega$: angular velocity (rad/s); both Equations 1 & 2 are found to be similar after comparison.

$$v=r\omega \quad \text{(Equation 3)}$$

$$I=mr^2 \quad \text{(Equation 4)}$$

$$T=rF=rm*dv/dt==mr^2d\omega/dt=I*\alpha$$

Equation 2 may be derived from Equations 3 and 4. In the case of impact pneumatic wrench, when the pneumatic motor drives the impact mechanism and the hammer for one (or half) revolution, the hammer stops after knocking the output shaft (the anvil); therefore angular velocity=0, and $d\omega=\omega-0=\omega$. Almost all of the rotational kinetic energy minus the heat generated during the impact may be converted to the kinetic energy delivered by each blow. The time taken for impact mechanism to knock the output shaft (anvil) dt is inversely proportional to the torque; in other words, for the same angular velocity, the shorter the impact duration, the larger the torque generated. However, the impact duration depends on the design of the mechanism, so within a certain range of impact force, the impact duration may be treated as a constant.

Therefore, from Equation 2, $T=I*\alpha=I*d\omega/dt$, the torque is proportional to the angular acceleration $\alpha$; in the case of the impact wrench, since the angular velocity may become 0 the moment the impact takes place, so $d\omega=\omega-0=\omega$, and the impact duration dt may be treated as a constant C; hence $T=I*\alpha=I*d\omega/dt$ in Equation 2 may be rewritten as $T=m*\omega$ (rpm)*C.

In other words, the torque exerted by the output shaft of the impact wrench is directly proportional to the mass m and angular velocity $\omega$ (rpm) of the impact mechanism and the hammer. For an impact wrench, the mass m of the impact mechanism and the hammer thereof is a constant. Before the impact mechanism and the hammer are driven by the pneumatic motor to reach the maximum angular velocity $\omega$ (rpm), the angular velocity thereof $\omega$ (rpm) is directly proportional to the air pressure and the airflow (of the pneumatic motor).

As can be appreciated from the foregoing descriptions, the torque output of the pneumatic torque wrench is directly proportional to the working air pressure; therefore, as long as the working air pressure can be steadily maintained within a permissible range, the torque output can be controlled within a target range.

As a matter of fact, the so called torque control of the torque tool is only capable of controlling the torque output of the torque tool. Since each fastener varies in terms of its material and surface condition, so when the same torque is applied thereon, the tightening torque or clamping force achievable may differ. Consider the following: (Equation 5) T=K×D×W, where T: torque, D: the nominal diameter of the screw or bolt (mm), W: the axial force of the screw or bolt, and K: nut factor. The nut factor K is a key parameter, which is primarily attributed to the friction between the thread and the bearing surface. K=K1+K2+K3, where K1 represents the nut factor for the bearing surface of the nut or bolt, and it accounts for around 50% of the total nut factor K; K2 represents the coefficient of friction for the contact surface on the flanks of the thread, and it accounts for around 40% of the total nut factor K; K3 represents the nut factor due to the stretching of the bolt, and it accounts for around 10% of the total nut factor K.

Hence, the torque controlling method of the present invention is not just capable of controlling the output torque of the torque tool in a precise manner, and it allows the user to adjust the torque output according to the condition of fastener during the calibration as well, so as to meet the practical requirement.

Figure 2:
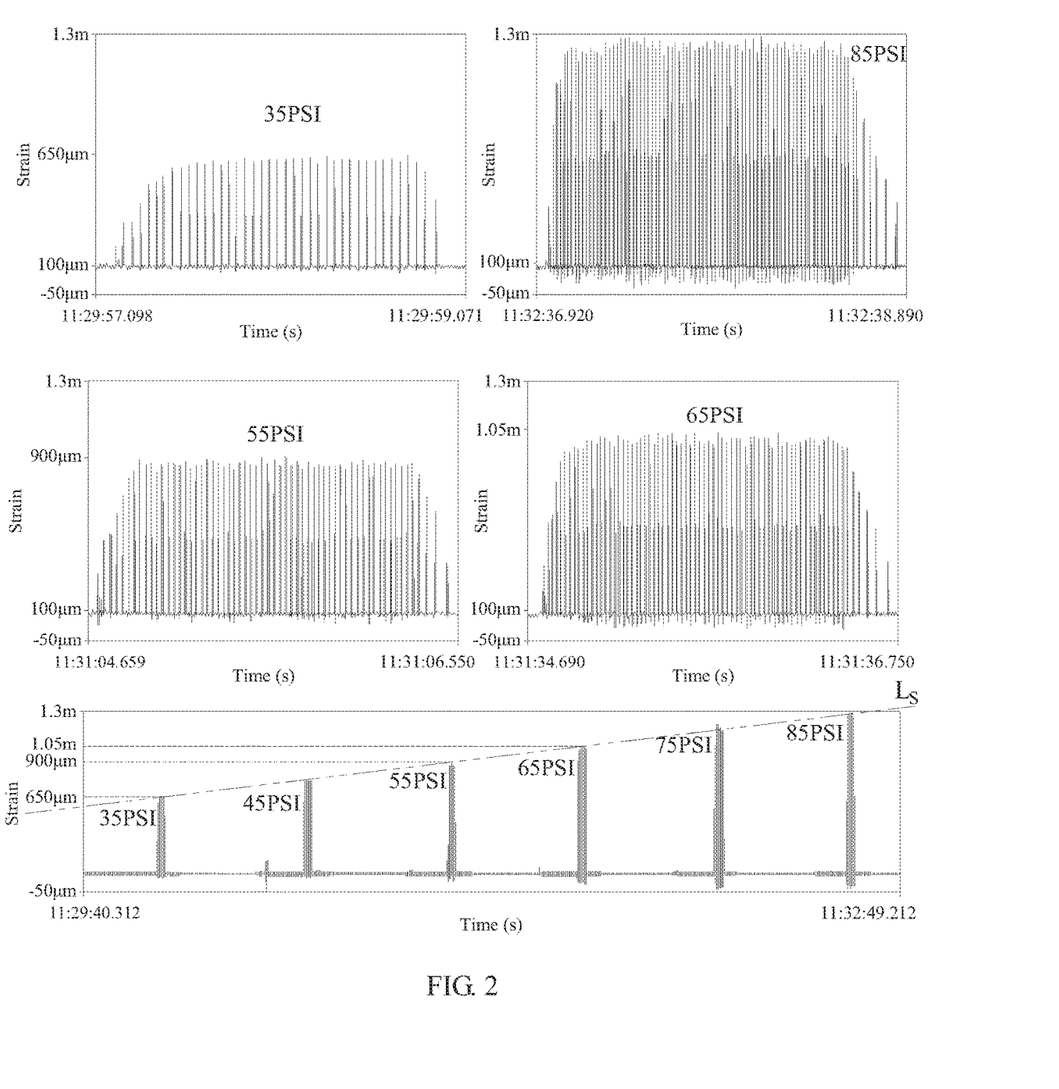
FIG. 2 is the experimental results showing the detected strain signal under different air pressure according to the method of controlling torque of the present invention.

Please refer to FIG. 2, which is the experimental results showing the relationship between the air pressure and the sensed strain signals according to the method of controlling torque of the present invention. The NI pulse analysis system (software NI LABVIEW Signal Express, hardware NI cDAQ-9172) is used to measure the pulses generated by the pulse torque wrench, wherein the pulse torque wrench generates the pulses under the conditions of constant air consumption, same fastening duration, as well as stable and monitored air pressure, e.g. 85 PSI (pounds per square inch); from the pulse form generated, it is apparent that the amplitude thereof has a stable height (1.3 m strain value), and the equivalent torque generated may be determined from the amplitude under that particular pressure. Then, from a pulse form generated under another lower stable pressure condition, e.g. 35 psi, a similarly stable results (650 μm strain value) can be observed as well; alternatively, in the pressure range of 35-85 psi, similarly stable amplitude (900 μm and 1.05 m strain value) may also be observed when pressures of 55 and 65 psi are separately supplied to the tool. Wherein, the Y-axis on the detection results of the NI pulse analysis system is the strain value, which is convertible to torque value. The X-axis is the impact time (the tool uses the same impact time but different pressure to fasten a fastener). Simply put, under the condition of constant air consumption and stable working air pressure, as long as the highest and lowest working air pressures supplied to the tool can be steadily maintained within a predetermined, permissible range, the highest and lowest amplitudes obtained will exhibit near-linear pressure-torque relationship, as shown in the line LS in FIG. 2. The stable working air pressure may also be comprehended as an operable air pressure of the pneumatic torque tool.

Based on the theory and empirical data above, when the pneumatic torque tool is exerting torque to a fastener, it is shown to exhibit properties of: for the same pneumatic torque wrench, under the conditions of predetermined airflow, same fastening duration and same stable working air pressure, the torque wrench will exert similar torque to a soft or hard fastener. That is to say, as long as the pneumatic torque wrench is working in conjunction with the aforementioned torque control apparatus, and the working pressure drop (%) of the tool is monitored throughout the fastening process, such that it is maintained within a stable range, the torque output may be controlled within certain target range. Therefore, the inventor deems that, as long as the tool is under the conditions of predetermined airflow and same fastening duration, when the tool is driven separately with the highest and lowest working air pressures that can be steadily maintained to perform fastening, and the working air pressure is monitored throughout the fastening process, a near-linear correspondence relationship between the pressure and torque values may be constructed according to the highest and lowest working air pressures, as well as the maximum and minimum torque values respectively corresponding to the measured highest and lowest working air pressures. A target torque value between the maximum and minimum torque values may be entered, and the microprocessor of the torque control apparatus of the present invention may compute the corresponding working air pressure based on the stored correspondence relationship between the pressure and the torque values, such that the tool may be driven to perform the fastening operation; when the predetermined time is reached, the air supply may be turned off to stop the operation of the pneumatic torque tool. Therefore, the torque output may be maintained within a predetermined and permissible range, and the poor control accuracy caused by the slow response of the tool, owing to the between the control component and the sensors, may be mitigated. However, because of various reasons, for instance, the gap between the socket and the fastener such as a bolt, the way the tool is held, and the condition of the fastener, the relationship between the torque values and the pressure values is not completely linear. In practice, the upwards or downwards shifts from the linear relationship may be treated as the marginal error of the torque control, and a satisfactory level of torque control accuracy may still be achieved after all.

Figure 4:
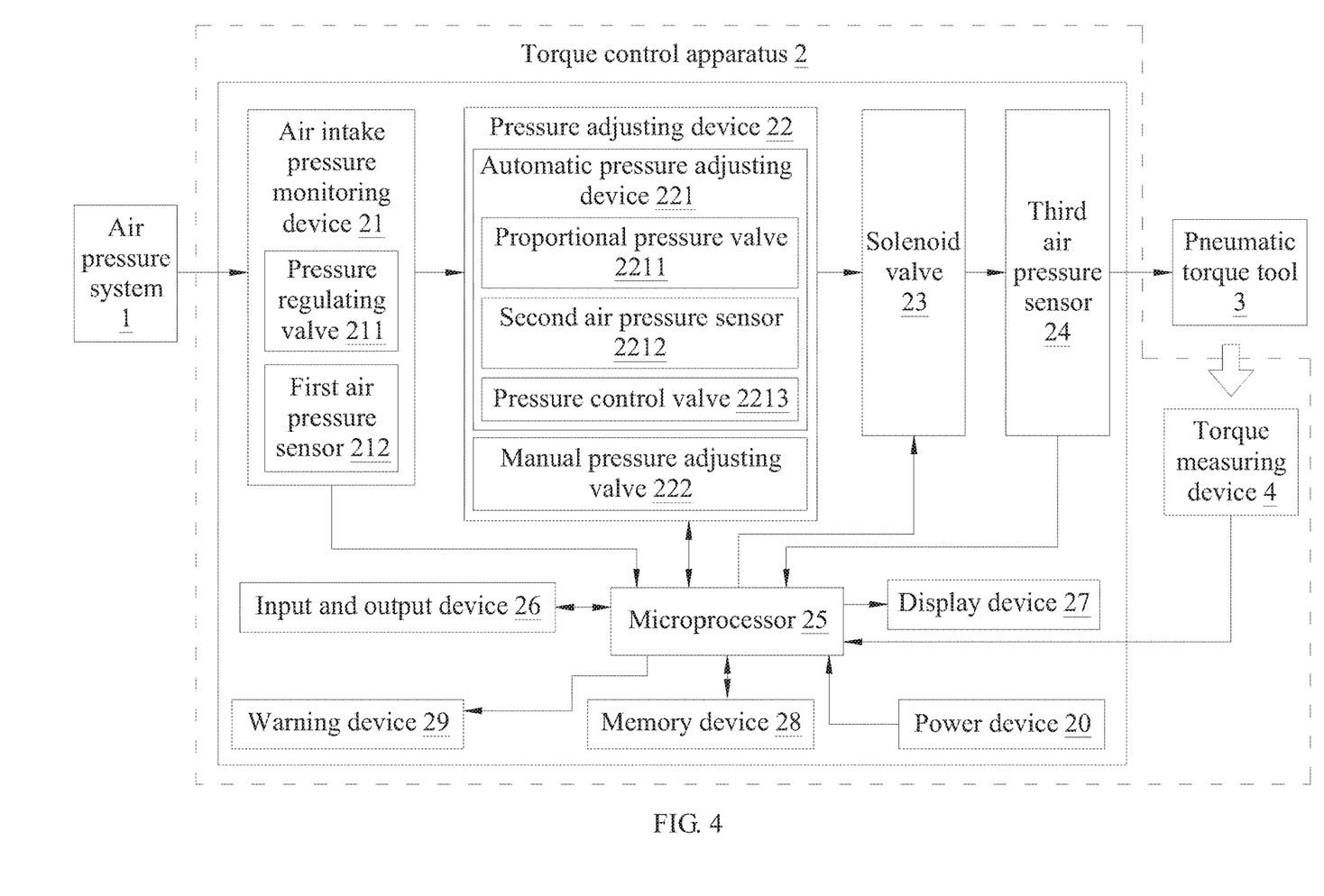
FIG. 4 is a block diagram according to an embodiment of the torque control apparatus of the present invention.

Please refer to FIG. 4, which is a block diagram according to an embodiment of the torque control apparatus of the present invention. As shown in the diagram, in most embodiments, the torque control apparatus 2 of the present invention may be installed between the air pressure system 1 and the pneumatic torque tool 3. Torque control apparatus 2 may include the air intake pressure monitoring device 21, pressure adjusting device 22, solenoid valve 23, third air pressure sensor 24, memory device 28, microprocessor 25, input and output (I/O) device 26, warning device 29 and power device 20.

In particular, the air intake pressure monitoring device 21 may be a pressure regulating valve 211, which may limit the pressure supplied by the air pressure system 1 within a predetermined range of pressure (e.g. 100 psi, depending on how much each component in the control device can withstand), so as to protect the relevant components; alternatively, the air intake pressure monitoring device 21 may be the first air pressure sensor 212, when an overwhelming pressure is detected or the detected air pressure falls beyond the operable range of the air pressure for the pneumatic torque tool, the first air pressure sensor 212 may cause the solenoid valve 23 to turn off the air supply to the torque tool, so as to protect the relevant components, or it may cause the warning device 29 to emit a warning signal.

In particular, the pressure adjusting device 22 may be an automatic pressure adjusting device 221, which may include a proportional pressure valve 2211, a second air pressure sensor 2212, and a pressure control valve 2213. When the operator enters any target torque value $T_X$ that is between the maximum and minimum torque values, the automatic pressure adjusting device 221 may automatically adjust the working air pressure to a working air pressure $P_X$, which corresponds to the target torque value $T_X$, according to the correspondence relationship between air pressure and torque values computed by the microprocessor 25; alternatively, the pressure adjusting device 22 may be a manual pressure adjusting valve 222, and the operator may manually adjust the pressure to a working air pressure $P_X$, which corresponds to the target torque value $T_X$, in accordance with the pressure value displayed on the display device.

More specifically, the proportional pressure valve 2211 serves to adjust the pressure control valve 2213, by means of boosting or relieving pressure, in response to the instruction of the microprocessor and the pressure detected by the second air pressure sensor 2212, such that the air intake pressure from the air pressure system 1 to the solenoid valve 23 is adjusted through the pressure control valve 2213, and thereby achieving the purpose of automatic pressure adjustment.

The third air pressure sensor 24 is interposed between the solenoid valve 23 and the pneumatic torque tool 3, so as to detect whether the pressure supplied to the pneumatic torque tool 3 is maintained within a stable range, such that the working air pressure of the pneumatic torque tool 3 is controlled within a predetermined permissible range throughout the fastening operation. With the help of the aforementioned components, a stable, controllable air pressure may be supplied to the pneumatic torque tool 3, such that the pneumatic torque tool 3 is capable of exerting a stable and controllable torque.

Figure 5:
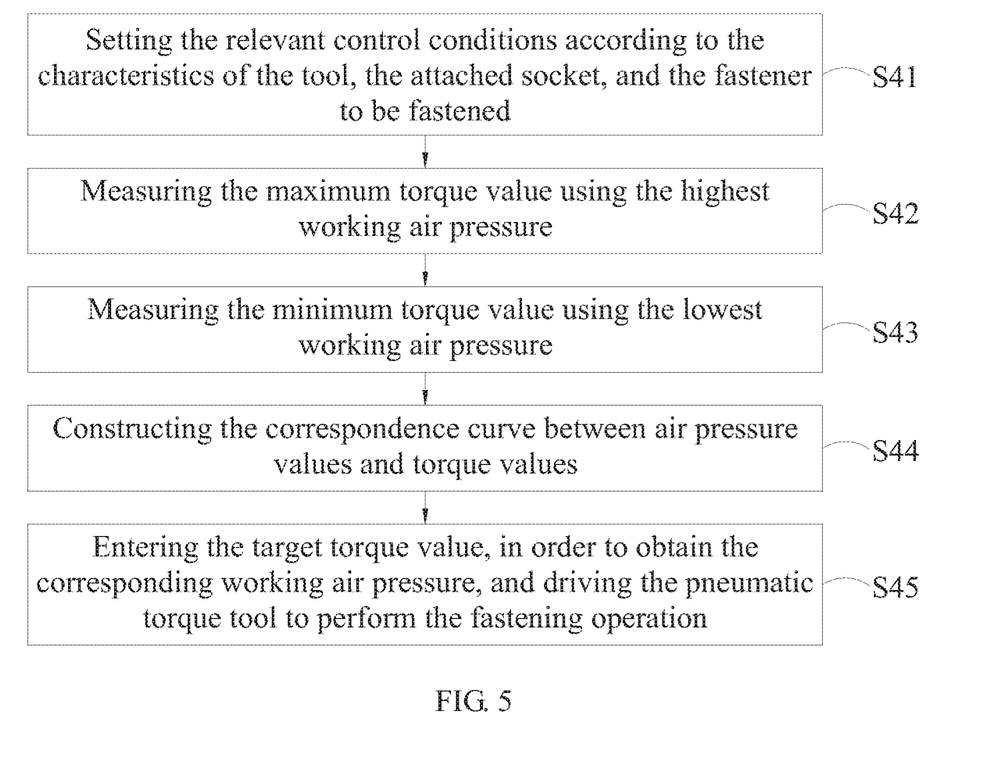
FIG. 5 is a schematic diagram on the operation of an embodiment of the torque control apparatus of the present invention.

Hereinafter, reference should be made to FIG. 5, which is a schematic diagram on the operation of an embodiment of the torque control apparatus of the present invention. The relevant steps of the operation are as follows:

(S41) Setting the relevant control conditions according to the characteristics of the tool, the attached socket, and the fastener to be fastened. In particular, before the fastening operation, various predetermined operating conditions, e.g. the amount of airflow, the duration for the fastening operation, a ratio of pressure drop of the air pressure system compared to the highest working air pressure, a ratio of actual working air pressure compared to a pressure at which the pneumatic tool is running at free speed, a permissible range of variation of the actual working air pressure when the fastening is completed, and the range determining whether a target torque value is met, may be set to suit the conditions of the tool, the fastener, and the object to be fastened.

(S42) Driving the pneumatic torque tool 3 with the highest working air pressure, and measuring the maximum torque value using torque measuring device. For instance, the "$T_H$ setting button" (not illustrated in the drawings) on the I/O device 26 may be pressed. On this occasion, the microprocessor 25 may control the pressure adjusting device 22 to automatically adjust the pressure to the highest level that can be steadily maintained; when the warning device 29 shows that the adjustment is completed, the pneumatic torque tool 3 may be initiated to drive the socket, so as to perform the torque calibration; the microprocessor 25 may drive the pneumatic torque tool 3 at the highest working air pressure $P_H$. Meanwhile, air pressure of the tool at the beginning and the end of the calibration, along with the measured torque values, which may serve as the maximum torque value $T_H$, may be stored in the memory device 28.

(S43) Driving the pneumatic torque tool 3 with the lowest working air pressure, and measuring the minimum torque value using torque measuring device. For instance, the "$T_L$ setting button" (not illustrated in the drawings) on the I/O device 26 can be pressed. On this occasion, the microprocessor 25 may control the pressure adjusting device 22 to automatically adjust the pressure to the predetermined lowest pressure; when the warning device 29 shows that the adjustment is completed, the pneumatic torque tool 3 may be initiated to drive the socket, so as to perform the torque calibration; the microprocessor 25 may drive the pneumatic torque tool 3 at the lowest working air pressure $P_L$. Meanwhile, air pressure of the tool measured at the beginning and the end of the calibration, along with the measured torque values, which may serve as the minimum torque value $T_L$, may be stored in the memory device 28.

(S44) Constructing the correspondence relationship between the air pressure and the torque values. Since the memory device 28 has already stored the aforementioned highest working air pressure $P_H$ and lowest working air pressure $P_L$, as well as the maximum torque value $T_H$ corresponding to the highest working air pressures $P_H$ and the minimum torque value $T_L$ corresponding to the lowest working air pressure $P_L$, the microprocessor 25 is capable of constructing a correspondence relationship between the air pressure and the torque value that is nearly linear.

(S45) Entering the target torque value, in order to perform the actual fastening operation. In other words, the target torque value $T_X$, which is between the maximum torque value $T_H$ and the minimum torque value $T_L$, is entered; in accordance with the stored correspondence relationship between the air pressure and the torque values, the microprocessor 25 of the torque control apparatus 2 may instantly compute the corresponding working air pressure, which may be displayed on the display device 27 and the warning device 29; the pressure may be adjusted to the level of the working air pressure $P_X$, which corresponds to the target torque value $T_X$, by means of the manual pressure adjusting valve 222 controlled by the operator or the automatic pressure adjusting device 221 controlled by the microprocessor 25. Please refer to FIG. 3. Therefore, the pneumatic torque tool 3 may be driven to perform the fastening operation, and when the predetermined time is reached, the microprocessor 25 may control the solenoid valve 23 to shut off the air supply, such that the tool is stopped and the fastening operation for the fastener is completed.

It is noteworthy that, in Steps (S42) and (S43), the maximum and minimum torque values $T_H$ and $T_L$ may be measured using the torque measuring device 4. For instance, the torque measuring device 4 may be a torque calibration tool that is commonly used in the art, such as a torque wrench with digital display or a torque meter; the torque measuring device 4 may also be a built-in or external torque transducer that is attached to the torque output end of the pneumatic torque tool 3, and the torque transducer may transmit the detected signal to the torque control apparatus 2 via wired or wireless transmission. The Steps (S42) and (S43) may be repeated to obtain a plurality of maximum torque values $T_H$ and minimum torque values $T_L$, as well as the corresponding highest working air pressure $P_H$ and lowest working air pressure values $P_L$; under the circumstances, the microprocessor 25 may sum the values of each of the variables and calculate its average, such that the correspondence relationship between the air pressure and the torque values may be constructed using the averaged maximum torque value $T_H$, minimum torque value $T_L$, highest working air pressure $P_H$ and lowest working air pressure $P_L$; consequently, a more accurate correspondence relationship between the air pressure and the torque value may be obtained.

Figure 6:
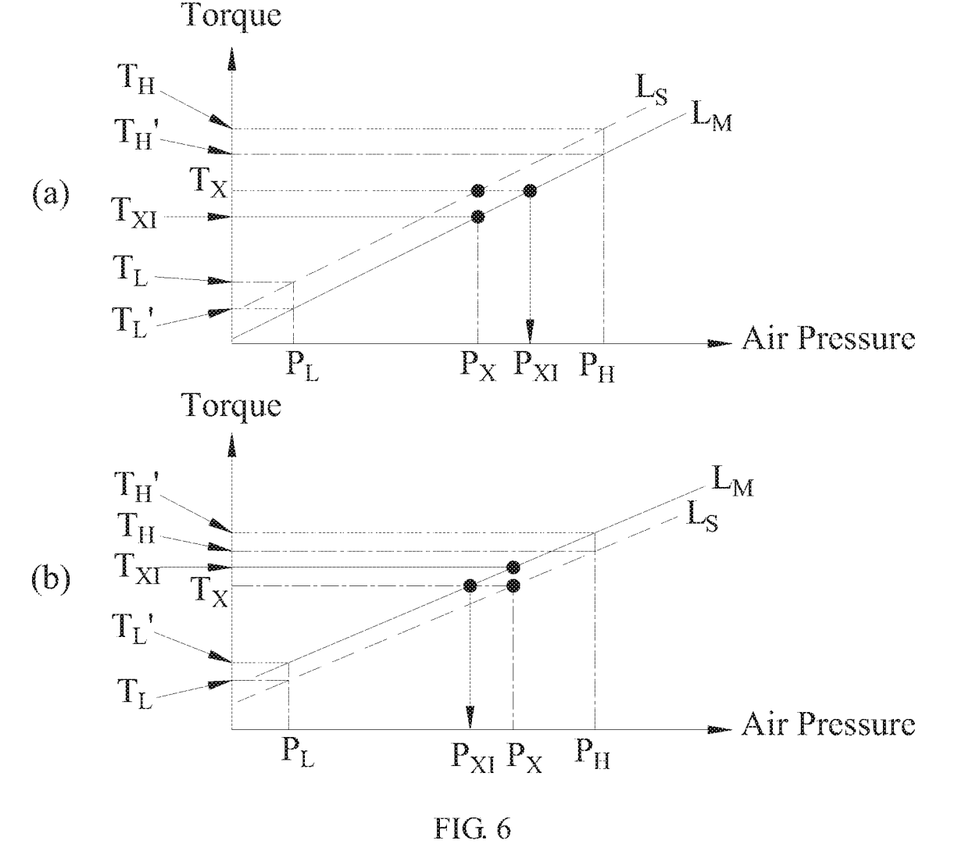
FIG. 6 is a diagram showing the adjustment of the correspondence relationship between the air pressure and the torque values according to an embodiment of the torque control apparatus of the present invention.

Hereinafter, reference should be made to FIG. 6, which is a diagram showing the adjustment of the correspondence relationship between the air pressure and the torque value according to an embodiment of the torque control apparatus of the present invention. The operator may use a torque calibration tool that he or she trusts or is familiar with to verify the torque after the fastening operation; if the measured torque from the verification is found to be differ from the target torque value $T_X$ by a large margin, the "correction button" (not illustrated) of the I/O device 26 may be pressed and the torque value from the verification may be entered, and the correction may be stored in the memory device 28; according to the corrected torque value $T_{XT}$, the microprocessor 25 may automatically adjust the correspondence relationship between the air pressure and the torque value $L_X$ (the adjusted correspondence relationship between the air pressure and the torque value is $L_M$), and the new range of torque that is controllable (the range of torque between the adjusted maximum and minimum torque values $T_H'$ and $T_L'$) is displayed. In simple words, when the corrected torque value $T_{XT}$ that is entered is less than the target torque value $T_X$, the correspondence relationship between the air pressure and the torque values may be downwards corrected (as shown in FIG. 6(a)). When the corrected torque value $T_{XT}$ that is entered is more than the target torque value $T_X$, the correspondence relationship between the air pressure and the torque values may be upwards corrected (as shown in FIG. 6(b)). When the target torque value is re-entered, a new corresponding working air pressure $P_{XXT}$ may be obtained from the corrected correspondence relationship $L_M$. The pneumatic torque tool 3 may be driven by the new working air pressure $P_{XT}$ to perform fastening, and then a verification may be performed whenever necessary, to ensure that the target torque value is met.

It is noteworthy that, during the fastening, when the detected air pressure exceeds the predetermined permissible range of variation, the torque control apparatus 2 may, in real-time, signal warning via the warning device 29 or control the solenoid valve 23 to shut off the air supply; when the air pressure returns to a range that is stable, the fastening operation may be resumed. In addition, the setting of the permissible range of variation may affect the precision of the torque during the fastening operation. In short, the larger the permissible range of variation, the poorer the torque control accuracy.

Figure 7:
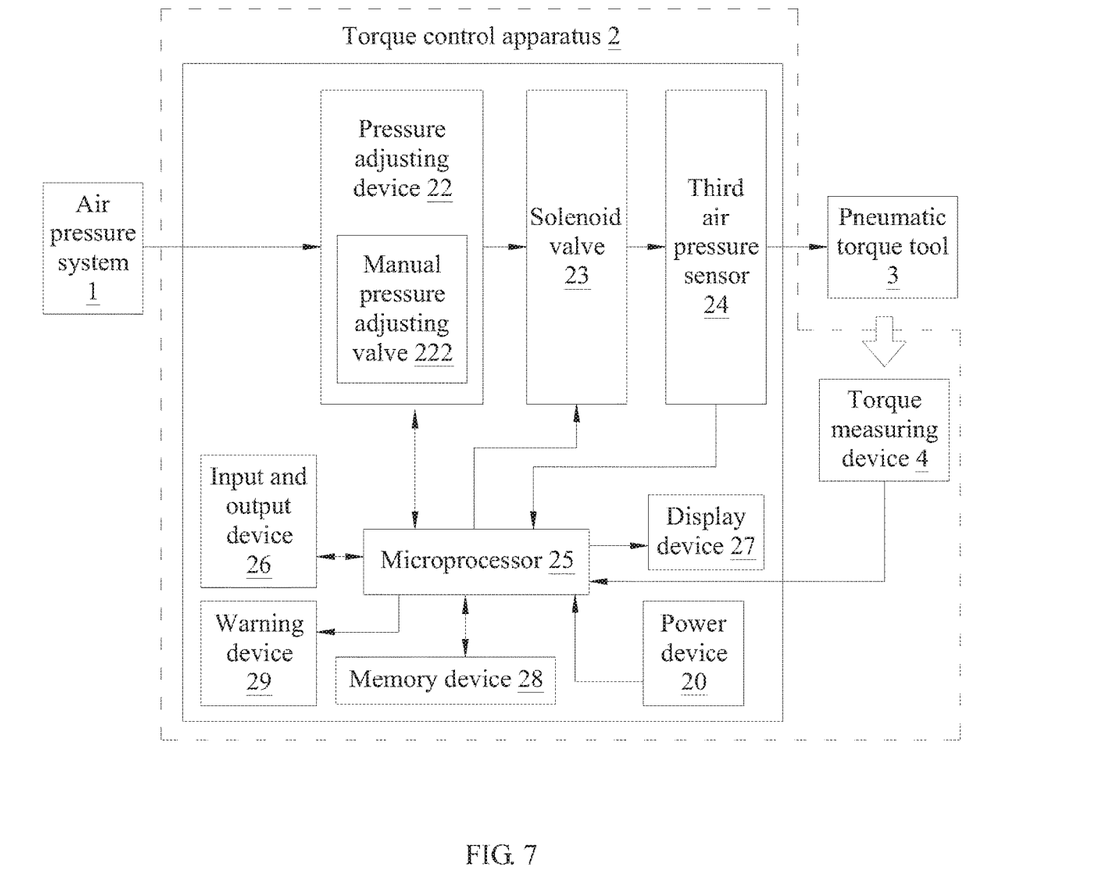
FIG. 7 is another block diagram according to an embodiment of the torque control apparatus of the present invention.

Reference should be made to FIG. 7, which is another block diagram according to an embodiment of the torque control apparatus of the present invention. As shown in the diagram, for the sake of the practical usage or cost consideration, the torque control apparatus 2 of the present invention may come without the aforementioned air intake pressure monitoring device 21, and the manual pressure adjusting valve 222 may be disposed in the pressure adjusting device 22, and the third air pressure sensor 24 may be disposed between the solenoid valve 23 and pneumatic torque tool 3. For instance, according to the stored correspondence relationship between the air pressure and the torque values, the microprocessor 25 may compute the working air pressure, which corresponds to the entered target torque value. According to the information on display device 27, the operator may manually adjust the air pressure using the manual pressure adjusting valve (Regulator) 222; when the adjustment is completed, the warning device 29 may notify the operator to proceed with fastening operation with light or sound.

Furthermore, experimental results show that, throughout the fastening operation, the pressure drop detected by each pressure sensor when a tool is running at free speed may differ significantly from that when a tool is actually fastening a fastener, because it consumes air at different rates. In other words, the pressure drop when the tool is running at free speed is larger than the pressure drop when the tool is running with load by a certain margin. Therefore, before the calibration of the maximum or minimum torque, the microprocessor 25 may drive the pneumatic torque tool 3 (the socket is not driven to perform fastening at this moment) for a while and then automatically stop the tool; the before-and-after pressure drop measured when the tool is driven in such a way, as long as the before-and-after pressure drop measured when calibrating the maximum or minimum torque are stored; during fastening operation, these data, which serve to provide accurate diagnosis and statistics, may be used to determine whether the tool is running at free speed (no load) or actually fastening.

In conclusion, the inventor has achieved a breakthrough over the conventional torque tool industry. The structural and assembly precision of the tool does not necessarily affect the torque control thereof. The conventional method of adjusting the amount of airflow through the tool and controlling the impact duration, or simple pressure control, all fail to achieve satisfactory results. In particular, for the impact or pulse torque tools, even if they are disposed with a torque transducer, it is hard to measure the torque due to the unstable signals generated from the impact pulses; on top of that, for various fasteners and objects to be fastened, various problems such as the material, hardness, surface smoothness, and the surface condition of the thread, all affect the precision of the tightening torque or the clamping force, and the impact of these factors significantly outweighs the quality or precision requirement of the tool itself.

The major feature of the present invention is that the relationship between the pulse signals of the impact or pulse torque tool and the torque thereof is sufficiently realized, and the pulse signals detection technique is mastered to eliminate the interference during the relay of signals is eliminated; therefore, prior to the fastening operation, according to the characteristics of the fastener and the object to be fastened that are to be used during the fastening, the torque control apparatus is used to perform calibration beforehand, and take advantage of the highest and lowest working air pressures and their corresponding maximum and minimum torque values that allow the tool to operate properly, the correspondence relationship is constructed. Then, between the maximum and minimum torque values, any target torque value may be entered; the microprocessor may indicate the working air pressure corresponding to the target torque value via the display device; when the air pressure is properly adjusted by the operator using the manual pressure adjusting valve or by the microprocessor instructing the automatic pressure adjusting device, a light may be turned on to indicate that the fastening operation with controllable torque may be proceeded. Even if the tool is disposed with a torque transducer, the microprocessor only treats the detection signals transmitted thereto as the parameters for the torque calibration. From the correspondence relationship between the working air pressure and the torque output constructed beforehand, the pressure required to meet the target torque value may be identified and then be used to drive the tool; throughout the fastening operation, the predetermined operating and control conditions are used to monitor the pressure drop and whether the pressure upon the completion of fastening is within the permissible range of variation, thereby achieving the purpose of torque control. In practice, the torque transducer only serves the calibration purpose before the actual fastening operation. The torque transducer is not necessary to be disposed externally or internally in the tool, and this not only prolongs the lifespan of the torque transducer, it reduces the high maintenance cost of the electronic control components by a great amount. Besides, the additional torque transducer, which is expensive, is no longer required, so the problem of impact or pulse torque tool being incapable of controlling the torque output can be solved once and for all.

The present invention provides a method of controlling torque and a torque control system using the method, and any pneumatic torque tool employing the technical features defined by the present invention is capable of achieving precise torque control. The inventive concept of the method of controlling torque and the torque control apparatus of the present invention is: throughout the fastening operation, a stable working air pressure may be maintained, and any desired target torque value may be entered, as long as the target torque value is between the maximum and minimum torque values, which respectively correspond to the maximum and minimum working air pressures, wherein the range of the maximum and minimum torque values as well as the maximum and minimum working air pressures that allow the tool to operate properly are obtained through the calibration prior to the fastening operation; the microprocessor may show the corresponding working air pressure, and the correct pressure may be reached by means of manual or automatic pressure adjustment, and the tool is driven by that pressure to perform fastening operation. For the precision of the torque output, the "permissible range of variation of the working air pressure" may be adjusted to meet the required precision; in addition, the user is allowed to correct the aforementioned correspondence relationship between air pressure and torque values on his own according to the actual torque value after verification to perform the fastening operation with torque control.

When the method of controlling torque and the torque control apparatus of the present invention is adapted to torque testing equipment, the dispute over the test results may be effectively resolved as well. For conventional torque testing equipment, during testing, there is no connection between the air supply piping of the pneumatic torque tool and the torque meter; in other words, when the torque meter is a conventional hydraulic one and the oil pressure gauge shows that the hydraulic pressure is insufficient, the operator may obtain the torque value from the hydraulic pressure-torque chart; when the torque meter is a digital one with torque detection component, a display device is electrically connected to the torque meter to show the measured torque value. However, the unstable air supply from the air pressure system tends to have its impact on the torque output test results of the tool undergoing the test. The torque control system of the present invention is capable of solving the issue. Using the torque control apparatus of the present invention, the air supply of the tool to be tested may be monitored throughout the whole duration of the testing, such that the pressure variation thereof is monitored and maintained within a predetermined allowable condition. With the apparatus, the initial and final air pressure signals from the air pressure sensors and the torque signals due to the deformation of the torque testing component may be obtained at the same time. Therefore, the test results may be presented in an accurate manner, and controversy may be avoided.

The content hereinbefore serves only illustrative purpose and does not limit the scope of the scope of the invention. Any modification or adaptation that does not go beyond the spirit or scope of the present invention should fall within the scope of the claims hereinafter.

What is claimed is:

1. A torque control method for a fastening operation of a fluid powered torque tool, comprising the following steps:
   connecting a fluid pressure system to a torque control apparatus with a fluid hose;
   determining a range of operable fluid pressure of the fluid powered torque tool according to characteristics of the tool, a fastener to be fastened or loosened and predetermined operating conditions, and supplying, by the fluid pressure system, fluid within the range of operable fluid pressure to the torque control apparatus and subsequently to the fluid powered torque tool accordingly;
   performing, by the torque control apparatus, calibration of output torque of the fluid powered torque tool by separately driving the fluid powered torque tool with a first working fluid pressure and a second working fluid pressure different from the first working fluid pressure, and obtaining a first torque value and a second torque value respectively corresponding to the first working fluid pressure and the second working fluid pressure, with the first working fluid pressure and the second working fluid pressure being within the range of operable fluid pressure;
   constructing, by the torque control apparatus, a correspondence relationship of pressure and torque according to the first working fluid pressure and the second working fluid pressure, and the first torque value and the second torque value;
   setting, by the torque control apparatus, a target torque value that is between the first torque value and the second torque value, and obtaining a corresponding working fluid pressure of the target torque value according to the correspondence relationship of pressure and torque; and
   applying, by the torque control apparatus, the corresponding working fluid pressure to the fluid powered torque tool to perform the fastening operation;
   the torque control method further comprising the following steps:
   entering a corrected torque value obtained by verifying the target torque value with a torque calibration tool;
   adjusting the correspondence relationship of pressure and torque according to a difference between the target torque value and the corrected torque value, and generating an adjusted correspondence relationship of pressure and torque with a corrected first torque value and a corrected second torque value; and
   obtaining the working fluid pressure corresponding to the target torque value based on the adjusted correspondence relationship of pressure and torque, and driving the fluid powered torque tool to perform the fastening operation accordingly.

2. The torque control method of claim 1, wherein the calibration of output torque comprises the step of:
   driving a torque measuring device with the fluid powered torque tool, wherein the torque control apparatus simultaneously collects a pressure signal measured by a fluid pressure sensor and a torque signal measured by the torque measuring device during calibration, and the pressure signal and the torque signal are stored in a memory device of the torque control apparatus.

3. The torque control method of claim 1, further comprising the following steps:
   during the fastening operation in which the fastener is fastened by the fluid powered torque tool, measuring a third torque value at which the fastener is fastened using the torque calibration tool corresponding to a third working fluid pressure measured by a fluid pressure sensor of the torque control apparatus; and
   storing the third torque value and the third working fluid pressure in a memory device of the torque control apparatus to update the correspondence relationship of pressure and torque.

4. The torque control method of claim 1, further comprising the following steps:
   repeating the calibration of output torque for a plurality of times to obtain a plurality sets of the first torque values and the second torque values corresponding to a plurality sets of the first working fluid pressures and the second working fluid pressures;
   calculating average values of the first torque values, the second torque values, the first working fluid pressures and the second working fluid pressures; and
   constructing the correspondence relationship of pressure and torque based on the average values of the first torque values, the second torque values, the first working fluid pressures, and the second working fluid pressures.

5. The torque control method of claim 1, wherein the target torque value obtained based on the adjusted correspondence relationship of pressure and torque is within a range between the corrected first torque value and the corrected second torque value.

6. The torque control method of claim 1, further comprising the following steps:
   monitoring a fluid pressure throughout the fastening operation or the calibration of output torque; and
   when the fluid pressure falls beyond the range of operable fluid pressure, signaling a warning through a warning device, or cutting the fluid supply to the fluid powered torque tool.

7. The torque control method of claim 1, wherein the correspondence relationship is a linear relationship established according to the first working fluid pressure and the second working fluid pressure, and the first torque value and the second torque value.

8. The torque control method of claim 1, wherein the predetermined operating conditions include a fluid flow rate and a fastening duration.

9. The torque control method of claim 1, wherein the first working fluid pressure and the second working fluid pressure are respectively a lowest working fluid pressure and a highest working fluid pressure defining a range of fluid pressure that allows the fluid powered torque tool to operate.

10. The torque control method of claim 1, wherein the fluid powered torque tool is a pneumatic torque tool or a hydraulic torque tool.

* * * * *